Figure 3:
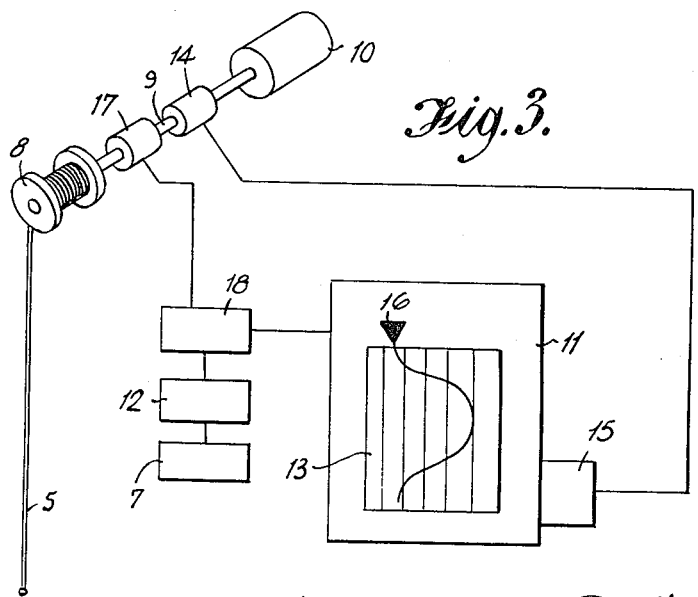

Jan. 15, 1963  M. W. JERVIS  3,073,959
FLUX SCANNING EQUIPMENT FOR NUCLEAR REACTORS
Filed Oct. 15, 1958  2 Sheets-Sheet 1
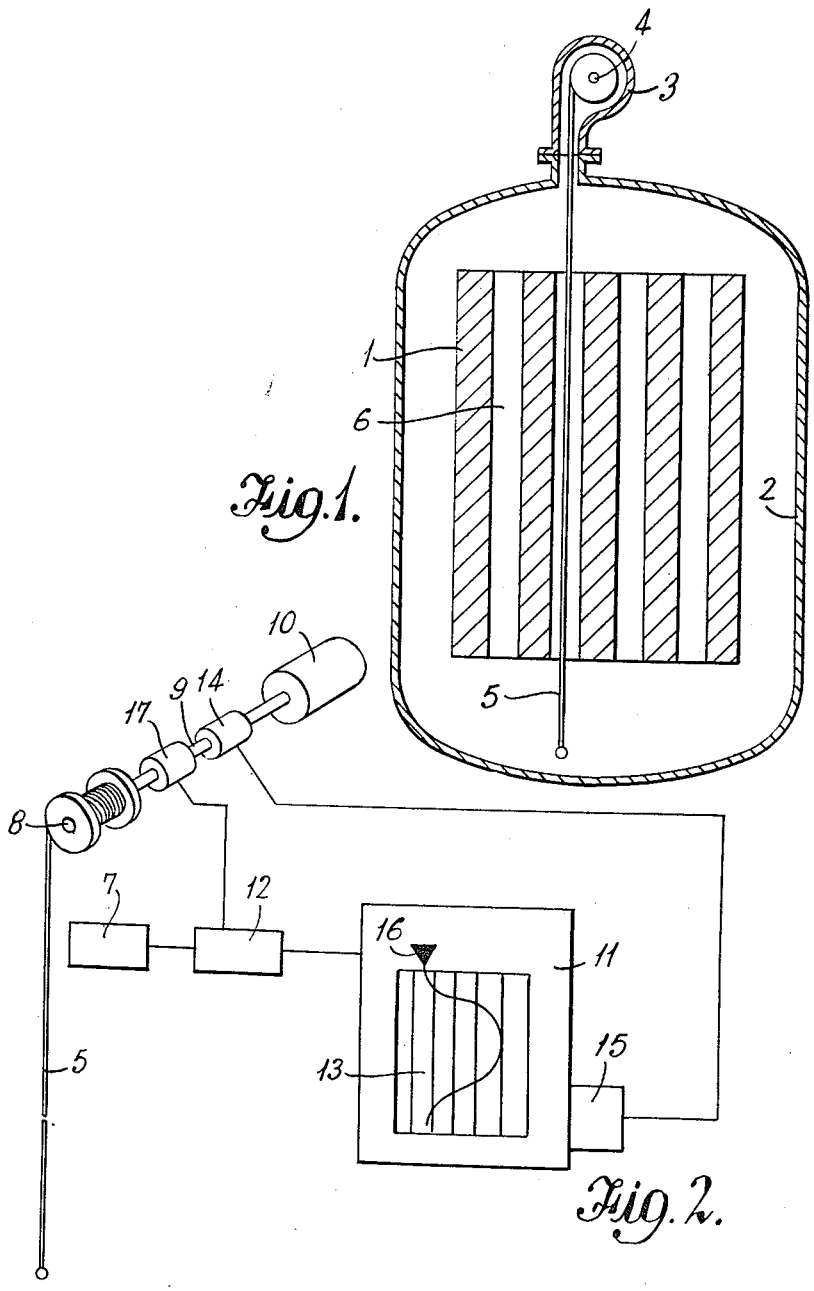
Applicant:
Max William Jervis
By Larson and Taylor
Attorneys

United States Patent Office 3,073,959
Patented Jan. 15, 1963

3,073,959
FLUX SCANNING EQUIPMENT FOR NUCLEAR REACTORS
Max William Jervis, Knutsford, England, assignor to A.E.I.-John Thompson Nuclear Energy Company Limited, London, England, a British company
Filed Oct. 15, 1958, Ser. No. 767,352
Claims priority, application Great Britain Oct. 18, 1957
3 Claims. (Cl. 250—83.6)

This invention relates to the determination of the neutron flux density distribution in the cores of nuclear reactors.

For determining the neutron flux density distribution in such reactors, generally known as "flux scanning," it is usual to insert into the reactor core a rod or wire, hereinafter referred to under the term "wire," generally constituted of tungsten. Irradiation of the inserted wire by the neutrons present in the core causes the wire to be activated, and on withdrawal from the reactor core, the wire will give off gamma and/or beta radiation, the intensity of which along different regions of the wire is dependent upon the neutron flux density at corresponding positions in the core. A record of the measurement of the intensity of radiation from the wire at successive regions spaced longitudinally thereof will therefore reproduce the distribution of the neutron flux density within the core. However, since it is necessary to insert the wire into, and withdraw it from one end of the core, a channel being provided within the core for the reception of the wire, the regions of the wire which are the first to enter the core and the last to be withdrawn from it are subjected to irradiation for a longer period than is the remainder of the wire. In fact a progressive unavoidable increase in the degree to which the wire is subjected to irradiation occurs from the upper to the lower end of the wire. If the time taken for insertion and withdrawal of the wire is short compared with the irradiation period, the non-uniformity introduced will be negligible; in practice, this is not the case, with the result that an indication of the radiation from the successive regions of the wire on withdrawal from the core will not give an accurate indication of the neutron flux density in the core.

According to the invention, this difficulty is overcome by providing means actuated in dependence on the motion of the wire as it is presented to a radiation responsive instrument for modifying the response of the instrument to compensate for the unavoidable non-uniformity in the duration of the period in which the wire is subjected to irradiation.

Apparatus for measuring the radiation from the wire subsequent to its introduction into and withdrawal from the core of the nuclear reactor accordingly consists of a radiation responsive instrument to which successive longitudinal regions of the wire are presented by effecting longitudinal motion of the wire, an electrical indicating device for indicating the response of the instrument to the radiation from the wire, and a device such as a variable impedance included in the circuit of the indicating device to modify the reading thereof to compensate for the unavoidable non-uniformity in the duration of the period in which the wire is subjected to irradiation, the impedance being varied in dependence on the longitudinal position of the wire.

The variation in the value of the impedance may be effected by providing a mechanical connection between the means adopted for effecting the longitudinal positioning of the wire with relation to the radiation-responsive instrument, and a member which determines the value of the impedance. For example, the mechanical connection may be to the contact arm of a variable resistance graded to correct for the non-uniformity in the duration of the irradiation period connected across the electrical indication device in such a way as to introduce a compensation into the indication given by the device in dependence on the longitudinal position of the wire with relation to the radiation-responsive instrument. Alternatively, a non-graded resistance may be employed, the contact arm of which is operated from the mechanical connection by means of a suitably shaped cam. The law of the grading of the resistance and/or the shape of the cam may be determined either by calculation of the flux distribution in the core of the reactor, or from measurements made with the correction not applied. Alternatively, a variable inductance or a variable capacitance may be employed. In the case of the variable capacitance a grading of the value of the capacitance may readily be obtained by a suitable shaping of the electrodes of the condenser used as the capacitance.

Figure 4:
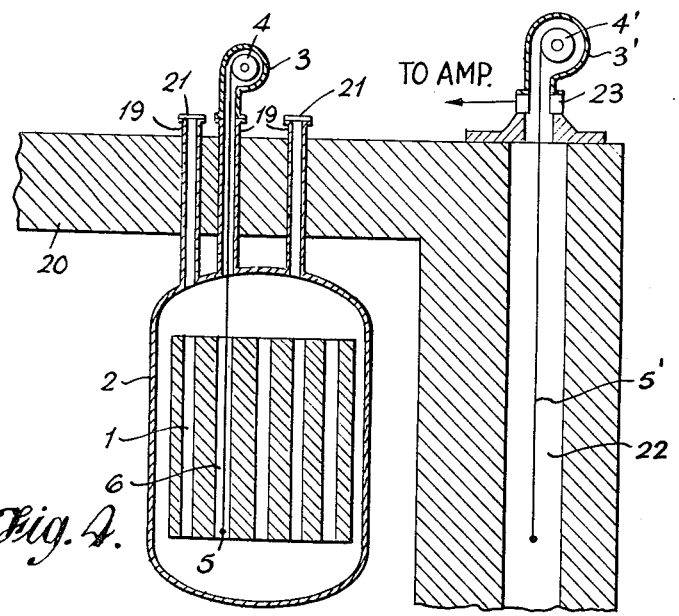

The invention will now be described with the aid of the accompanying diagrammatic drawings, in which:

FIG. 1 shows diagrammatically a cross-section of a reactor core, showing the means by which the wire can be inserted into, and withdrawn from, the core, FIG. 2 is a representation of the apparatus adopted for indicating the radiation from the wire after it is removed from the core, FIG. 3 shows a development of the apparatus of FIG. 2, and FIG. 4 shows the arrangement of the reactor core in greater detail.

In FIG. 1 I have illustrated a reactor core 1 enclosed in an outer casing 2, provided with test apparatus housed within an extension 3 within which is located a pulley 4 around which the testing wire 5 is wound. The wire 5 is adapted to be introduced into a vertical channel 6 and withdrawn from the channel by rotation of the pulley 4. After removal from the channel the test apparatus is transferred to a test site and the wire is subjected to a measurement to determine the distribution of the intensity of the gamma or beta radiation from successive regions longitudinally displaced along the wire.

One form of the apparatus for testing the radiation from the wire is shown in FIG. 2, the wire 5 being moved in front of a radiation-responsive instrument 7, so as to present successively to the instrument, regions of the wire longitudinally spaced therealong. The wire is unwound from a pulley 8, mounted on a shaft 9 rotatable, for example, by means of an electric motor 10.

The instrument 7 may be in the form of an ion chamber, the activity in which is measured by means of an electrical indicating device 11, after amplification in an amplifier 12. The device 11 is shown as being of the recording type, the chart paper 13 of which is moved in corresponding relation to the longitudinal positioning of the wire 5. This may be effected as shown, by means of a selsyn link, the transmitter 14 of which is connected to the shaft 9, the receiver 15 being used to effect movement of the chart 13. The pen 16 of the device 11 accordingly draws a graph on the chart representative of the radiation emitted by the wire at successive longitudinally spaced regions thereof. Other means for obtaining the correlated movements of the rod and chart may readily be visualised.

Alternatively or in addition to the recording apparatus, indicating apparatus may be employed.

In order to compensate for the non-uniformity of the duration of the period during which the wire is subjected to irradiation, necessitated by its introduction into and withdrawal from the core, a variable resistor 17 connected in a suitable part of the measuring circuit, e.g. to the amplifier 12, is altered in a way related to the position of the wire, so that the sensitivity of the measuring circuit corrects for the non-uniform irradiation error. Resistor 17, may, as mentioned above, be in the form of a graded potentiometer, or a potentiometer, the contact arm of which is moved by a suitably shaped cam driven by the shaft 9.

FIG. 3 shows a modification of the arrangement of FIG. 2, in which a subtraction circuit 18 is introduced between the amplifier 12 and the recorder.

In this case the output from the variable resistor 17 is not fed to the amplifier 12 as in FIG. 2, but to the subtraction circuit 18 in which it is subtracted from the output from amplifier 12.

FIG. 4 shows a development of FIG. 1, in which the test casing 3 is shown fitted into the upper end of one of a number of stand pipes 19 extending through the biological shield 20 and pressure vessel 2 and aligned with the channel 6. The remaining stand pipes are sealed with covers 21.

The normal procedure would be to lower the test wire 5, leave it for a suitable period, e.g. 30 minutes. It would then be wound up on to the reel 4. The test equipment would then be removed and placed over the test passage 22 as indicated by the reference 4' which shows a test equipment in place. The wire 5' in the arrangement shown is lowered through an annular ionisation chamber 23 which may constitute the chamber 7 of FIG. 3 and be connected to amplifier 12.

It will be appreciated that in all cases the measuring apparatus may be recording apparatus, e.g. a chart recorder, or it may merely give variable indication as by means of a meter.

What I claim is:

1. Apparatus for determining the flux density distribution in the core of a nuclear reactor comprising a vertical channel in said core, said channel extending substantially the full length of said core, a wire of sufficient length to extend substantially the full length of said channel, means for lowering said wire into said channel and for raising said wire out of said channel after subjection to the radiation in said reactor, radiation measuring means responsive to radiation emitted by said wire after removal from said core, means for progressively presenting portions of said wire to said radiation measuring means to obtain a measurement of the local intensity of radiation progressively along the length of said wire, and means for modifying the indication of radiation intensity obtained by said radiation measuring means in accordance with the position along said wire at which the measurement is obtained.

2. Apparatus for determining the flux density distribution in the core of a nuclear reactor comprising a vertical channel in said core, said channel extending substantially the full length of said core, a wire of sufficient length to extend substantially the full length of said channel, means for lowering said wire into said channel and for raising said wire out of said channel after subjection to the radiation in said reactor, an ionization chamber, means for passing said wire progressively adjacent said ionization chamber, measuring means operatively connected to said ionization chamber, and means for modifying signals passed from the ionization chamber to said measuring means in accordance with the position along said wire at which the measurement is obtained.

3. Apparatus for determining the flux density distribution in the core of the nuclear reactor comprising a vertical channel in said core, said channel extending substantially the full length of said core, a wire of sufficient length to extend substantially the full length of said channel, means for lowering said wire into said channel and for raising said wire out of said channel after subjection to the radiation in said reactor, radiation measuring means responsive to radiation emitted by said wire after removal from said core, means for progressively presenting portions of said wire to said radiation measuring means to obtain a measurement of the local intensity of radiation from the wire progressively along the length thereof, and means for reducing the value of the indication given by said radiation measuring means when presented to portions of said wire in inverse proportion to the duration of time in which said portions are located in said core said last-named means including a variable resistor.

References Cited in the file of this patent

UNITED STATES PATENTS 2,751,505     Anderson _____ June 19, 1956
2,768,134     Fermi et al. _____ Oct. 26, 1956

OTHER REFERENCES

A Wire-Activation Technique for Reactor-Flux-Profile Measurements, by Klickman, A. E. et al., Battelle Memorial Institute, BMI-1086; Apr. 25, 1956; 14 pages.